US011242886B2

(12) United States Patent
Turbenson (10) Patent No.: US 11,242,886 B2
(45) Date of Patent: Feb. 8, 2022

(54) HOOK ADAPTED FOR SECURING ON A CYLINDRICAL BODY

(71) Applicant: Dave Turbenson, Medina, MN (US)

(72) Inventor: Dave Turbenson, Medina, MN (US)

(*) Notice: Subject to any disclaimer, the term of this patent is extended or adjusted under 35 U.S.C. 154(b) by 174 days.

(21) Appl. No.: 16/151,024

(22) Filed: Oct. 3, 2018

(65) Prior Publication Data

US 2019/0101152 A1 Apr. 4, 2019

Related U.S. Application Data

(60) Provisional application No. 62/567,458, filed on Oct. 3, 2017.

(51) Int. Cl.
| | | |
|---|---|---|
| *F16B 45/00* | (2006.01) | |
| *A47B 57/30* | (2006.01) | |
| *F16B 2/24* | (2006.01) | |
| *A47F 5/00* | (2006.01) | |
| *A47B 96/06* | (2006.01) | |

(52) U.S. Cl.
CPC .............. *F16B 45/00* (2013.01); *A47B 57/30* (2013.01); *A47B 96/06* (2013.01); *A47F 5/0006* (2013.01); *F16B 2/245* (2013.01); *F16B 2/248* (2013.01); *A47B 2230/0003* (2013.01)

(58) Field of Classification Search
USPC .................................................. 248/302, 304
See application file for complete search history.

(56) References Cited

U.S. PATENT DOCUMENTS

| | | | | | |
|---|---|---|---|---|---|
| 1,007,843 | A | * | 11/1911 | Botsford | G09F 7/18 248/218.4 |
| 3,064,933 | A | * | 11/1962 | Brasty | A47G 7/044 248/227.3 |
| 3,432,129 | A | * | 3/1969 | Santucci | F16L 3/237 248/69 |
| 4,027,842 | A | * | 6/1977 | Mittleman | A61F 5/44 248/75 |
| 6,209,837 | B1 | * | 4/2001 | Harms | A47B 57/567 248/210 |
| 6,254,049 | B1 | * | 7/2001 | Goehly | A01G 17/08 248/302 |
| 6,375,141 | B1 | * | 4/2002 | Kettlestrings | A47B 43/006 211/106.01 |
| 7,273,153 | B1 | * | 9/2007 | Kuniyoshi | A47F 5/083 211/85.7 |
| 7,395,997 | B2 | * | 7/2008 | Padden | B60R 7/10 248/303 |
| 7,506,466 | B2 | * | 3/2009 | Betham | G09F 15/00 248/218.4 |

(Continued)

*Primary Examiner* — Monica E Millner
(74) *Attorney, Agent, or Firm* — Gutwein Law; Greg Geiser (57) ABSTRACT

A hook adapted for securing on a cylindrical body is disclosed. The hook is comprised of a pair of attachment ends having an arcuate shape and coupled through a connecting portion. The arcuate shape of the attachment ends having a radius corresponding to a radius of the cylindrical body the device is received upon, wherein the arcuate shape and dimension is selected and configured to provide a compressive force to the cylindrical body to maintain a position of the device. The device having a plurality of hook ends and adapted to securing a multitude of objects.

21 Claims, 5 Drawing Sheets

(56) References Cited

U.S. PATENT DOCUMENTS

| | | | | |
|---|---|---|---|---|
| 7,739,775 | B2* | 6/2010 | Shimanski | B60P 7/0807 |
| | | | | 24/265 H |
| D706,617 | S * | 6/2014 | Hendricks | D8/394 |
| 8,746,640 | B2* | 6/2014 | Broadley | F16B 45/00 |
| | | | | 248/220.21 |
| 2002/0000504 | A1* | 1/2002 | Bayne | F21S 4/10 |
| | | | | 248/302 |
| 2005/0087662 | A1* | 4/2005 | Jacobs | H02G 3/30 |
| | | | | 248/339 |
| 2007/0252061 | A1* | 11/2007 | Feetham | A47F 5/0006 |
| | | | | 248/302 |
| 2009/0108035 | A1* | 4/2009 | Obenauf | A47G 25/1457 |
| | | | | 223/1 |
| 2014/0283449 | A1* | 9/2014 | Rapone | A47G 7/044 |
| | | | | 47/67 |
| 2016/0106085 | A1* | 4/2016 | Boots | A01K 97/10 |
| | | | | 248/219.1 |

* cited by examiner

HOOK ADAPTED FOR SECURING ON A CYLINDRICAL BODY

CROSS REFERENCE TO RELATED APPLICATIONS

This application claims priority to U.S. Provisional Patent Application No. 62/567,458 filed 3 Oct. 2017 to the above named inventor, and is herein incorporated by reference in their entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

This invention relates generally to attachment device configured for receipt on a cylindrical body to create a hanging surface.

BACKGROUND

Within the prior art, a popular storage system utilizes horizontal shelves positioned on generally cylindrical and tubular bodies, with the cylindrical bodies positioned at the corner of the shelves and generally forming the legs and vertical structural support for the horizontal shelves. This storage system is generally utilized for both residential, retail, and commercial uses in storage and display. The storage system is generally adjustable and configured to several positions allowing for customization in the form of shelf height and placement. Generally, these shelves are assembled in place and do not typically get moved or adjusted on a regular basis.

The storage system is generally universal and includes cylindrical poles having a diameter and typically constructed out of chromed steel, painted steel, or stainless steel and configured to receive wire shelves of similar materials.

While these shelves are useful in storing things along the individual horizontal shelf surfaces, there exists a need to improve the storage capabilities of these storage systems and in particular provide an attachment device that can be configured with multiple hook ends for secure attachment to a cylindrical structure along the unused vertical portions of the storage system. Preferably, this attachment device is easily attached and removed to allow for placement in various positions along the vertical portion and does not otherwise require movement of individual shelves or the shelving system.

BRIEF SUMMARY OF THE INVENTION

In one aspect, this disclosure is related to an attachment device configured for securing around a cylindrical structure in an engaged position.

In another aspect, this disclosure is related to a hook with an attachment end portion configured for removable receipt around a cylindrical structure and movable between a disengaged position and an engaged position. The attachment end structural shape and material properties allow for attachment and removal without any tools or additional fasteners. The attachment end is adapted to provide a compressive force to the cylindrical structure around a diameter, wherein this compressive force is capable of securing the hook and materials supported on the hook.

The device of the present disclosure is comprised of a first end and a second end opposed the first end. The first end and the second end are in a connected coupling through a connecting portion. The first end and the second end are generally arcuate in shape with a portion of the curve of the arc corresponding substantially to the diameter of the cylindrical body the device is placed upon.

Each of the first end and the second end having an attached end and a free end. The attached end of the first end and the attached end of the second end coupled to together with the connecting portion, wherein the first end, the second end, and the connecting portion form a continuous formed wire shape with a defined opening between the free end of the first end and the free end of the second end. The opening providing access to an interior of the wire shape allowing for placement around and attachment to the cylindrical body.

Overall the shape and proportions of the device, and in particular, the first end and second end arcuate curve and distance between them are specifically adapted to the diameter of the cylindrical body the device is intended to be received upon in the engaged position. Accordingly, the device has specific dimensional ratios to ensure the desired operation of the device.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

The following detailed description includes references to the accompanying drawing, which forms a part of the detailed description. The drawing shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIGS. 1-10 of the hook for securing on a cylindrical body and generally referred to as device 10. The device 10 is configured for attachment to a cylindrical body, such as a pole of a shelving unit, for generally hanging and supporting additional objects. Accordingly, the device 10 is configured for removal and re-attachment in various positions along the cylindrical body and without the need for additional fasteners and tools. The device 10 is provided in specific dimensional ratios to provide a compressive force to the cylindrical body that holds the device 10 in place and supports the weight of additional objects.

Figure 1:
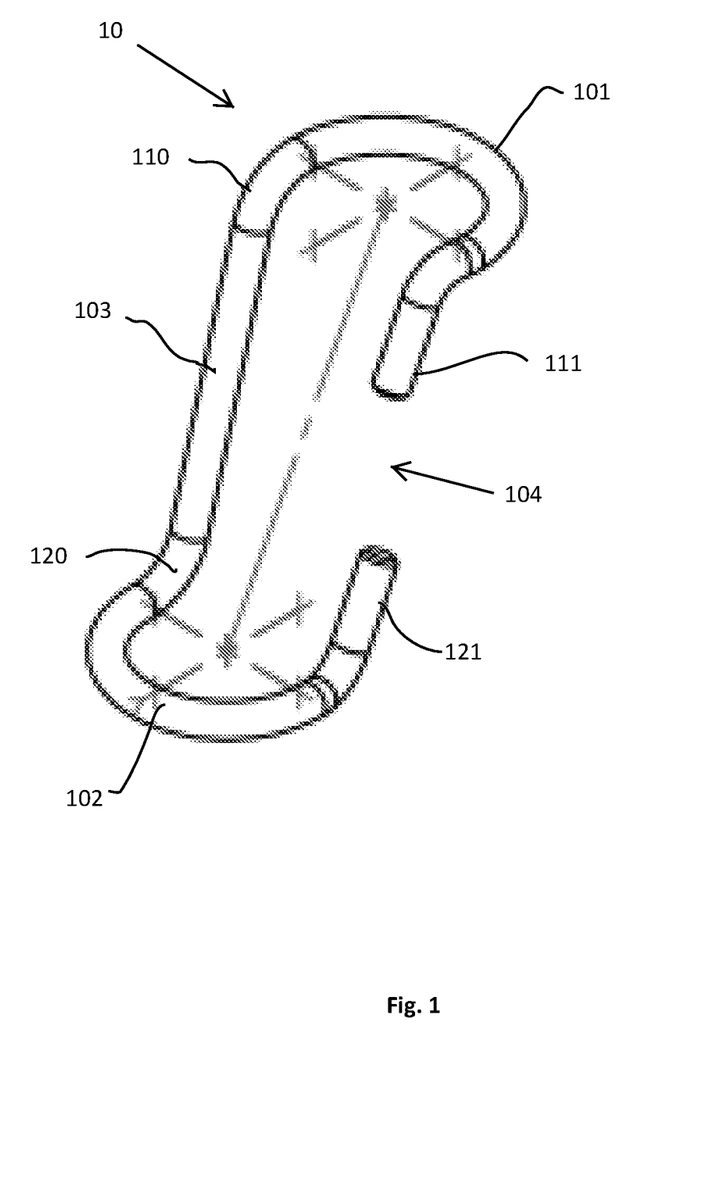
FIG. 1 is an isometric view of the device, according to the present disclosure.
Figure 2:
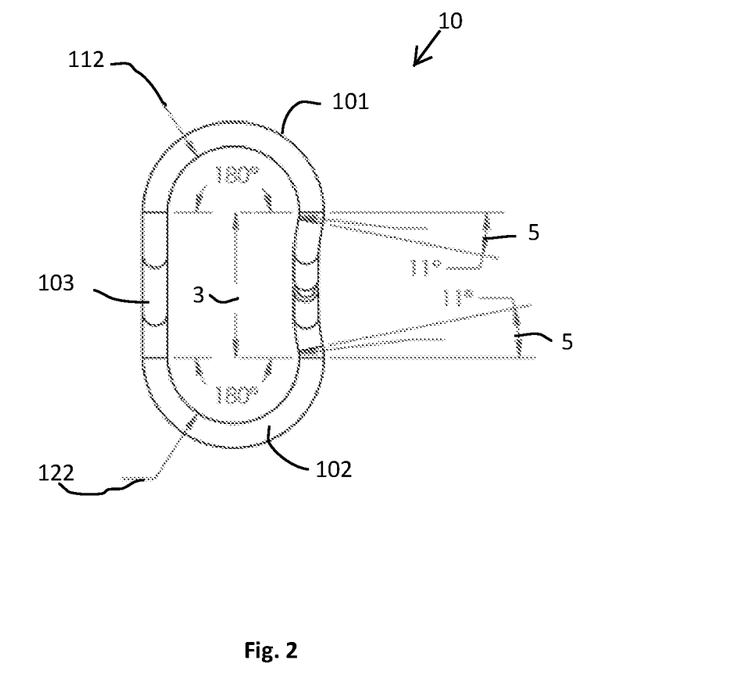
FIG. 2 is a top side view including the dimensional ratios of the device, according to the present disclosure.
Figure 3:
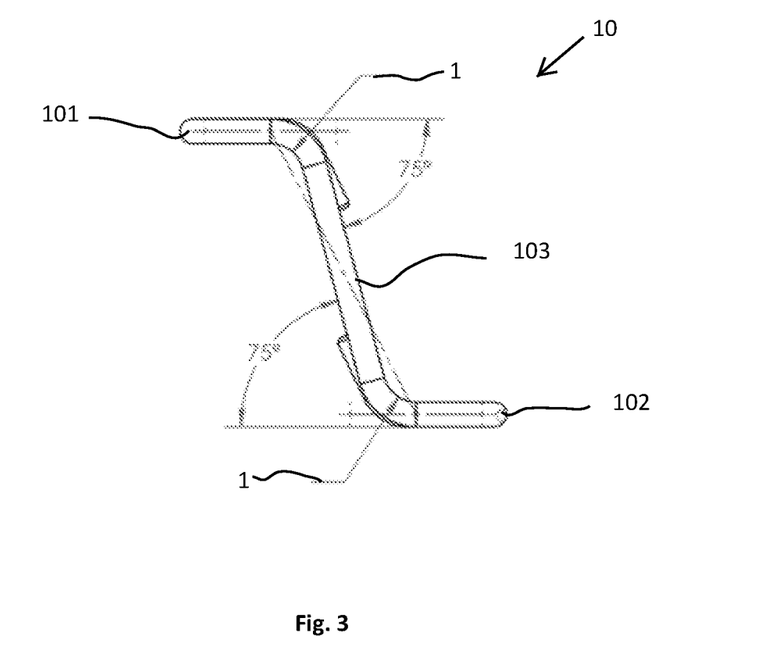
FIG. 3 is a left side view of the device including the dimensional ratios of the device, according to the present disclosure.
Figure 4:
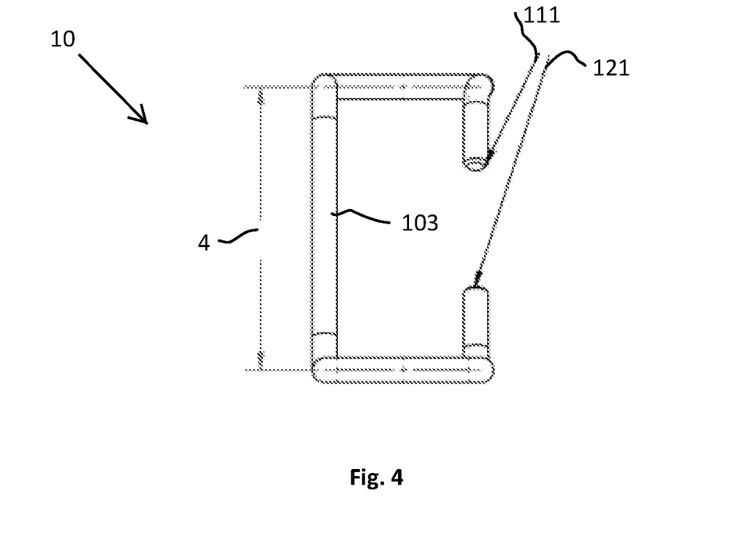
FIG. 4 is front side view of the device including the dimensional ratios of the device, according to the present disclosure.
Figure 5:
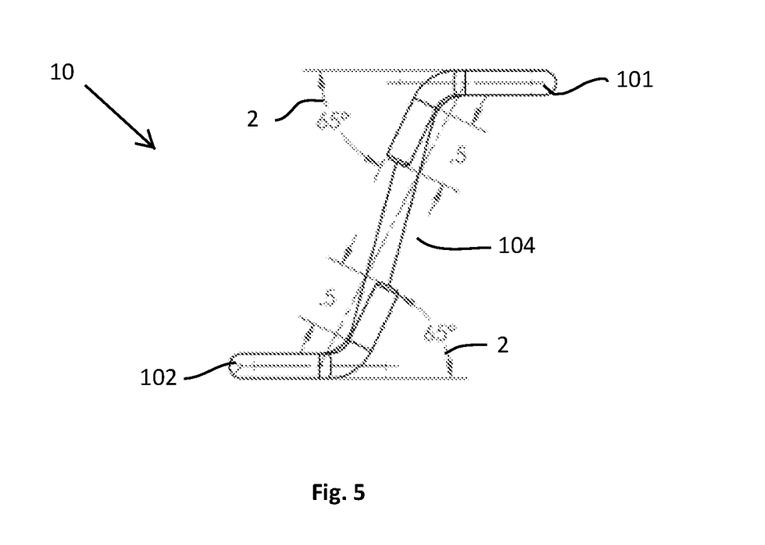
FIG. 5 is a right side view of the device including the dimensional ratios of the device, according to the present disclosure.
Figure 6:
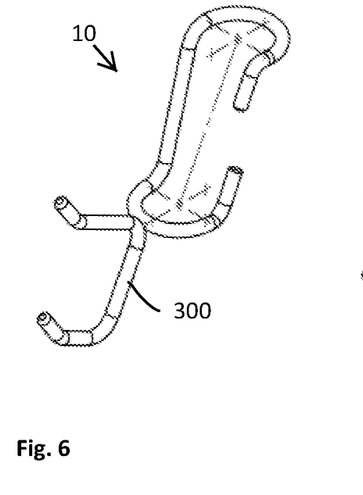
FIG. 6 an isometric view of an embodiment of the device, according to the present disclosure.
Figure 7:
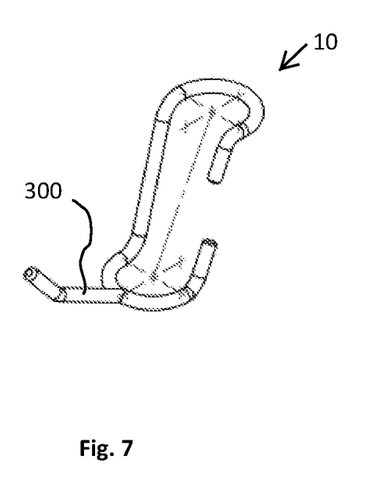
FIG. 7 is an isometric view of an alternate embodiment of the device, according to the present disclosure.
Figure 8:
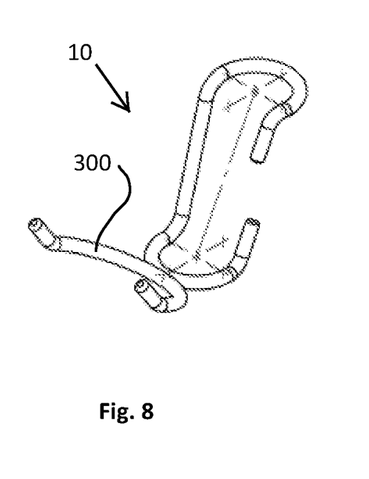
FIG. 8 is an isometric view of an alternate embodiment of the device, according to the present disclosure.
Figure 9:
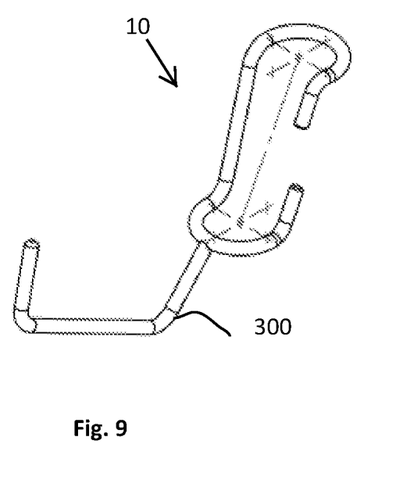
FIG. 9 is an isometric view of an alternate embodiment of the device, according to the present disclosure.
Figure 10:
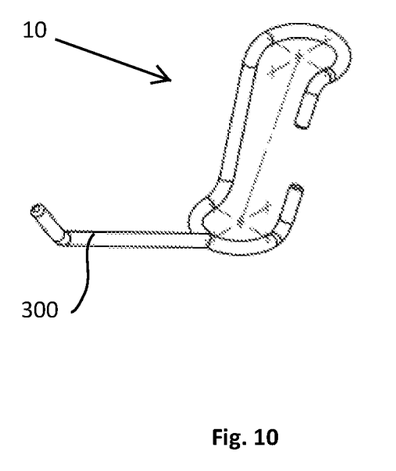
FIG. 10 is an isometric view of an alternate embodiment of the device, according to the present disclosure.

Referring now specifically to FIGS. 1-2 of the device 10. The device 10 is preferably constructed from a single wire form and bent into the proper shape. Preferably, the material of the device 10 is a wire having a diameter corresponding to a proportion of the diameter of the cylindrical body and comprised of a material capable providing a bending compressive force to the cylindrical body. This material of the device 10 can further be polished or manipulated through painting, powder coating, or other similar surface treatment.

The device 10 is comprised of a first end 101 and a second end 102 opposed the first end 101. The first end 101 and the second end 102 are coupled with a connecting portion 103. The first end 101 and the second end 102 are arcuate in shape with a portion 112, 122 of the curve of the arc corresponding to the diameter of the cylindrical body the device attachment end is placed upon. Accordingly, for example a pole within a diameter of 1″ will have the portion 112, 122 of the first end 101 and the second end 102 having an arc corresponding to a 1″ diameter. Preferably, the portion 112, 122 of the arc extends 180 degrees, wherein the arcuate portion 112, 122 extends half of the circumference of the pole the device 10 is placed upon.

Each of the first end 101 and the second end 102 having an attached end 110, 120 and a free end 111, 121. The attached end 110 of the first end 101 and the attached end 120 of the second end 102 in communication with the connecting portion 103, wherein the first end 101, second end 102, and connecting portion 103 form a singular continuous shape with a defined opening 104 between the free end 111 of the first end 101 and the free end 121 of the second end 102. The opening 104 providing access to an interior of the wire shape of the device 10 allowing for placement around and attachment to the cylindrical body.

Overall the geometric shapes and proportions of the device 10, and in particular, the first end 101 and second end 102 arcuate curve portions 112, 122 and distance between them, defined by a length 4 of the connecting portion 103, are specifically adapted to the diameter of the cylindrical body the device 10 is intended to be received upon. Accordingly, the device 10 has dimensional ratios to ensure the desired operation of the device 10 relative to the engagement on the cylindrical body.

The arcuate curve of the first end 101 and the second end 102 have an identical radius, with the identical radii corresponding to an equal radius derived from the diameter of the cylindrical body the device is placed upon. Accordingly, the radius of arcuate curve portions 112, 122 of the first end 101 and the second end 102 are identical to the radius of the cylindrical body.

The arcuate curve of the first end 101 and the second end 102 extends from the attached end 110, 120 to the free end 111, 121 an angular measurement greater than 180 degrees as measured from a predetermined center of the arcuate curve corresponding to the radius of the first end 101 and the second end 102. Preferably, the arcuate curve of the first end 101 and the second end 102 extends 191 degrees with the free ends 111, 121 extending a distance 5 eleven (11) degrees beyond 180 degrees to more generally encircle the cylindrical body and provide the compressive force to the cylindrical body.

The connecting portion 103 is received on the attached ends 110, 120 at an angle 1, wherein the first end 101 and second end 102 are arranged in an offset position compared to a completely vertical position of 90 degrees relative to the position of the first attached end 110 and second attached end 120. Accordingly, and preferably the angle 1 of receipt of the connecting portion 103 is approximately 75 degrees as measured from the attached end 110, 120 connection. Although 75 degrees is preferred, the angle 1 of receipt of the connecting portion 103 is generally adapted as a ratio corresponding to a predetermined center of the arcuate curve portion 112, 122 of the first end 101 and the second end 102 and the offset distance between them.

Similar to the angle of the connecting portion 103 and the attached ends 110, 120, the free ends 111, 121 extend towards the opposed end at an angle 2 of approximately 65 degrees. Although 65 degrees is preferred, the angle 2 of the free ends 111, 121 is selected as a ratio corresponding to the predetermined center of the arcuate curve of the first end 101 and the second end 102 and the offset distance between them.

The opening 104 between the free ends 111, 121 is provided to allow for the passage of the cylindrical body into an interior space of the device 10 at a generally horizontal position where the device 10 can be rotated into a vertical direction for securing on the cylindrical body. Accordingly, the arcuate radius of the ends 101 and 102 in combination with the spring force of the material of the device 10 secure the device 10 to the cylindrical body.

In the preferred embodiment of the present disclosure, the device 10 is configured for attachment to a cylindrical body having a 1" diameter. Accordingly, the dimensional ratios of the device 10 are specifically chosen to provide a secure attachment to the cylindrical body. For secure attachment to cylindrical body of this diameter, as is seen in FIG. 2, a distance 3 between the predetermined center point of the arcuate portions 112, 122 of the first end 101 and the second end 102 is selected to be slightly larger than the diameter of the cylindrical body the device is placed upon. As is shown, for a cylindrical body having a diameter of 1", the distance 3 is 1.1".

For the preferred embodiment, wherein the device 10 is configured for placement on a cylindrical body having a diameter of 1 inch, the device 10 is selected from a wire having a dimeter of 3/16 of an inch and comprised of 304 stainless steel. Although these materials and dimensions are preferred for this diameter of cylindrical body, it is anticipated that different diameters and materials will be capable of functioning as the device 10 and selected based upon the given diameter of the cylindrical body and spring force required.

In use of the device 10, the device 10 is designed for placement on the cylindrical body by placing the cylindrical body within the device 10 interior through the opening 104 in a generally horizontal disengaged position and rotating the device 10 to a vertical engaged position where it will be secured onto the cylindrical body. This rotating action forces the partial openings of the first end 101 and the second end 102 to open slightly into a more oval shape, wherein the device 10 spring tension generally grips the cylindrical body over an area greater than 360 degrees.

The pair of free ends 111, 121 and the attachment angle 2 of the device 10 are positioned to be in line axially when the device 10 is rotated to the engaged position. This position and angle 2 allow the device 10 to disperse its surface contact area across the cylindrical body through the clamping process during movement to the engaged position.

Referring now to FIGS. 6-10 the device 10 is provided with a multitude of hook end portions 300 that are affixed to the second end 102 extending outward from the device 10 interior generally perpendicular to the cylindrical body the device 10 is placed upon. The hook end portions 300 can be provided in numerous styles and shapes depending upon need. The hook end portions 300 are generally coupled to the second end 102 in a secure coupling such as welding, although other similar and durable coupling methods may be utilized.

The hook end portions 300 position on the second 102 further aids in securing the device 10 to the cylindrical body when an object is placed upon them. Accordingly, the weight on the hook portions 300 of the object provides a torsional force causing the first end 101 and second end 102 to push tighter to the cylindrical body providing an additional grip.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

What is claimed is:

1. An attachment device configured for receipt on a cylindrical body having a predetermined diameter with a radius, the attachment device comprising:
   a first end, the first end having an arcuate shape with a portion of the arcuate shape having a first radius corresponding to the radius of the cylindrical body with the arcuate shape extending a distance greater than 180 degrees of the predetermined diameter and defining a first interior;

a second end, the second end opposed the first end and having an arcuate shape with a portion of the arcuate shape having a second radius corresponding to the first radius and the radius of the cylindrical body with the arcuate shape extending a distance greater than 180 degrees of the predetermined diameter and defining a second interior, the second interior aligned with the first interior, wherein the first end first interior and second end second interior define an interior space;

a connecting portion, the connecting portion coupled to an end of the first end and an end of the second end; and an opening, the opening positioned opposite the connecting portion and sized for receipt of the cylindrical body within the interior space, wherein the attachment device comprises a spring force material to provide a compressive force that holds the device to the cylindrical body in an engaged position, wherein the attachment device has fixed dimensional ratios, wherein the dimensional ratios are specifically configured according to the predetermined diameter of the cylindrical body the attachment device is intended to be received upon, in a way to confer a secure fitting of the attachment device onto the cylindrical body.

2. The attachment device as in claim 1, wherein the device is comprised of a single continuous wire.

3. The attachment device of claim 1, wherein the first end arcuate shape extends at least 191 degrees and the second end arcuate shape extends at least 191 degrees.

4. The attachment device of claim 1, wherein the connecting portion is coupled to the first end and the second end at an angle of 75 degrees compared to a vertical position of 90 degrees.

5. The attachment device of claim 1, wherein the second end includes a hook end portion, the hook end portion extending outward opposite the second interior.

6. The attachment device of claim 5, wherein the hook end portion extends outward and perpendicular to the cylindrical body the device received upon.

7. An attachment device configured for receipt on a cylindrical body having a predetermined diameter with a radius and a circumference, the attachment device movable from a disengaged position to an engaged position, the attachment device comprising:

a first end, the first end having:
an attached end;
a free end; and
an arcuate shape with a portion of the arcuate shape having a first radius corresponding to the radius of the cylindrical body with the portion of the arcuate shape extending at least 180 degrees of the circumference of the cylindrical body and defining a first interior;

a second end, the second end opposed the first end and having:
an attached end;
a free end; and
an arcuate shape with a portion of the arcuate shape having a second radius corresponding to the first radius and the radius of the cylindrical body with the portion of the arcuate shape extending at least 180 degrees of the circumference of the cylindrical body and defining a second interior, the second interior aligned with the first interior, wherein the first end first interior and second end second interior define an interior space;

a connecting portion, the connecting portion coupled to the first end attached end and the second end attached at an angle; and an opening, the opening positioned between the first end free end and the second end free end opposite the connecting portion and sized for receipt of the cylindrical body within the interior space, wherein the attachment device comprises a spring force material to provide a compressive force that holds the device to the cylindrical body when in the engaged position, wherein the attachment device has fixed dimensional ratios, wherein the dimensional ratios are specifically configured according to the predetermined diameter of the cylindrical body the attachment device is intended to be received upon, in a way to confer a secure fitting of the attachment device onto the cylindrical body.

8. The attachment device as in claim 7, wherein the device is comprised of a single continuous wire.

9. The attachment device of claim 7, wherein the first end arcuate portion extends 191 degrees of the circumference of the cylindrical body and the second end arcuate portion extends 191 degrees of the circumference of the cylindrical body.

10. The attachment device of claim 7, wherein the connecting portion angle is 75 degrees compared to a vertical position of 90 degrees.

11. The attachment device of claim 7, wherein the second end includes a hook end portion, the hook end portion extending outward opposite the second interior.

12. The attachment device of claim 11, wherein the hook end portion extends outward and perpendicular to the cylindrical body the device received upon.

13. An attachment device configured for receipt on a cylindrical body having a predetermined diameter with a radius and a circumference, the attachment device movable from a disengaged position to an engaged position, the attachment device comprising:

a first end, the first end having:
an attached end;
a free end; and
an arcuate shape with a portion of the arcuate shape having a first radius corresponding to the radius of the cylindrical body extending at least a distance corresponding to 180 degrees of the circumference and defining a first interior;

a second end, the second end opposed the first end and having:
an attached end;
a free end; and
an arcuate shape with a portion of the arcuate shape having a second radius corresponding to the first radius and the radius of the cylindrical body extending at least a distance corresponding to 180 degrees of the circumference and defining a second interior, the second interior aligned with the first interior, wherein the first end first interior and second end second interior define an interior space;

a distance between a predetermined center of the first arcuate portion and a predetermined center of the second arcuate portion being greater than the diameter of the cylindrical body;

a connecting portion, the connecting portion coupled to the first end attached end and the second end attached at an angle and extending a length; and an opening, the opening positioned between the first end free end and the second end free end opposite the connecting portion and sized for receipt of the cylindrical body within the interior space, wherein the attachment device comprises a spring force material to provide a compressive force that holds the device to the cylindrical body when in the engaged position, wherein the attachment device has fixed dimensional ratios, wherein the dimensional ratios are specifically configured according to the predetermined diameter of the cylindrical body the attachment device is intended to be received upon, in a way to confer a secure fitting of the attachment device onto the cylindrical body.

14. An attachment device as in claim 13, wherein the distance is at least 1.1 times the diameter of the cylindrical body.

15. The attachment device as in claim 14, wherein the length is at least twice the diameter of the cylindrical body.

16. The attachment device of claim 15, wherein the second end includes a hook end portion, the hook end portion extending outward opposite the second interior.

17. The attachment device of claim 16, wherein the hook end portion extends outward and perpendicular to the cylindrical body the device received upon.

18. The attachment device of claim 7, wherein the engaged position is obtained by placing the cylindrical body within the interior space in the disengaged position and rotating the attachment device to the engaged position, wherein the spring force material provides a compressive force that holds the device to the cylindrical body over an area greater than 360 degrees when in the engaged position.

19. The attachment device of claim 7, wherein the first end free end and the second end free end extend towards opposite directions at an attachment angle.

20. The attachment device of claim 19, wherein the attachment angle is 65 degrees compared to a vertical position of 90 degrees.

21. The attachment device of claim 20, wherein the pair of free ends and the attachment angle are positioned to be in line axially when the device is rotated to the engaged position.

* * * * *